KEYING CIRCUIT WITH FOUR TERMINAL NETWORK FOR INDEPENDENT KEYING OF PLURAL REPEATERS WITHOUT INTERFERENCE

Filed Jan. 11, 1960

Inventors
K. ISHIMOTO
A. MORIMOTO
By C. H. Suydam
AGENT

1

3,116,423

KEYING CIRCUIT WITH FOUR TERMINAL NETWORK FOR INDEPENDENT KEYING OF PLURAL REPEATERS WITHOUT INTERFERENCE

Kunio Ishimoto and Akira Morimoto, Tokyo, Japan, assignors to Nippon Electric Company, Limited, Tokyo, Japan, a corporation of Japan Filed Jan. 11, 1960, Ser. No. 1,677

Claims priority, application Japan Jan. 20, 1959

3 Claims. (Cl. 307—88.5)

This invention relates to keying arrangements, and especially to the keying on and off of signals in a signal repeater or transmission line.

A principal object of the invention is to provide an improved keying arrangement especially useful in connection with the keying on and off of repeaters such for example as are employed in alternating current signal transmission systems such as toll telephone dialing systems and the like.

Another object is to provide a keying arrangement whereby a plurality of transmission line or repeater circuits with respective keying controls, can be supplied with keying control power from a common direct current source without material interference between respective circuits when two or more of such circuits are simultaneously in operation.

A feature of the invention relates to a keying control for a transmission line or wave repeater, for example a repeater such as used in toll dialing systems or the like, using an alternating current carrier source connected in common to a plurality of repeaters and wherein each repeater can be keyed off or on independently and without interference with the other repeaters.

Another feature relates to a keying arrangement for a plurality of signal transmission circuits or repeaters employing varistors or similar asymmetric conductive devices which are connected in the respective lines or repeaters and to an associated direct current keying voltage source which is common to all the lines, and in conjunction with a novel resistance combination network whereby the directional conductivity of the varistors, or the like, can be selectively controlled by keying contacts without requiring an excessive withdrawal of power from the direct current source, even though a number of separate lines or repeaters are being simultaneously keyed.

Ancillary to the last mentioned feature is the additional feature that it is not necessary to employ a transformer or similar direct current isolating device at the input to the transmission line or at the output from the transmission line for the signal transmissions.

A further feature relates to the novel organization and interconnection of elements which constitute an improved keying repeater for keying an alternating current signal transmission line or repeater.

Other features will appear from the ensuing descriptions, the attached drawing and the appended claims.

In the drawing,

FIG. 1 is a schematic wiring diagram of a known carrier current keying arrangement such for example as is used in toll telephone dialing systems and the like;

FIG. 2 is a schematic wiring diagram of a keying arrangement according to the invention;

In toll telephone dialing systems it is conventional to transmit the dialing control in the form of an interrupted alternating current and to have one or more repeaters which receive the alternating current or carrier from a suitable source for transmission to another point. The dialing repeaters are provided with a keying relay or the like whose contacts control the application of ground in such a way as to control the interruption of the alternating current dialing signal through the repeater. In any such known arrangement wherein two or more such keyed repeater circuits receive their direct current keying power from a common direct current source, there is always the problem to prevent interference between respective repeaters due to a difference of potential between the repeater ground potential at the terminals of the respective repeaters which are being keyed. Furthermore, it is necessary to minimize the direct current power consumed from the common direct current keying supply when a plurality of lines or repeaters are being simultaneously keyed.

2

Figures 1, 2:
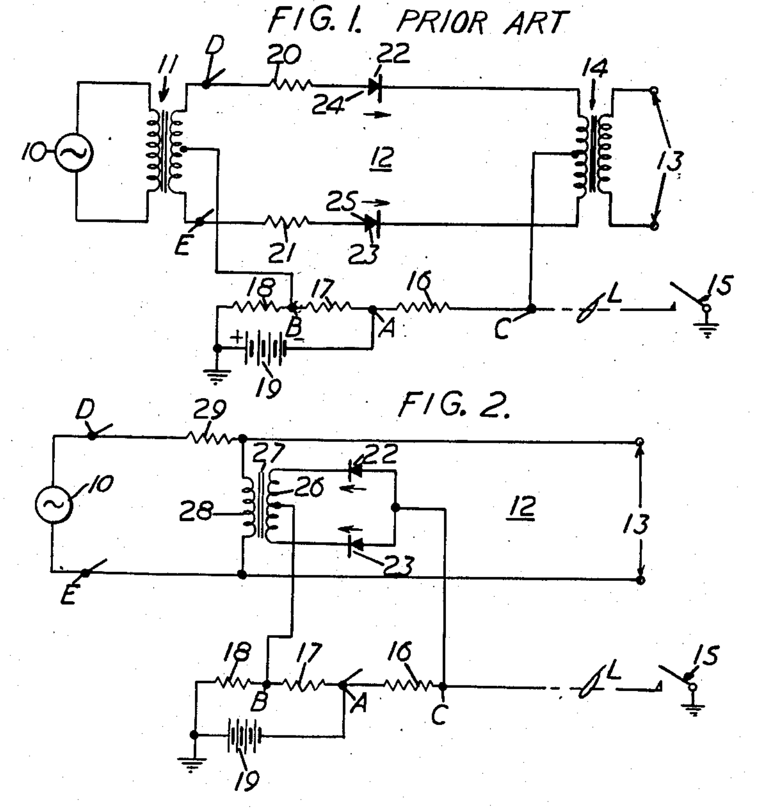
FIG. 1. PRIOR ART, FIG. 2.

FIG. 1 of the drawing shows a known form of keying arrangement which possesses the disadvantages which are overcome by the present invention. In order to understand the advantages of the invention, a description will first be given of the known arrangement of FIG. 1. The device 10 represents any well known source of alternating current such for example as is used for the transmission of toll dialing control in toll telephone signaling systems and the like. The source 10 is coupled through a suitable transformer 11 through a repeater 12 which is arranged to repeat the alternating current dialing signal from the source 10 to the outgoing terminals 13 through the intermediary of another transformer 14 at the output. The repeater circuit is keyed on and off by any suitable keying contacts 15 which are arranged to be opened and closed in accordance with keying signals, representing for example dialing control signals, so as to insert in the repeater circuit an insertion loss of such a character that in one condition, for example the open condition of contacts 15, the repeater is effective to transmit the alternating current from source 10 to the output terminals 13; while in the opposite condition, namely with contacts 15 closed, the transmission to the output is effectively interrupted or at least suppressed to a negligible level. One of the keying contacts is directly grounded while the other is grounded in series with three resistors 16, 17, 18. A source of direct current keying potential indicated schematically by battery 19 has its positive terminal also directly grounded and its negative terminal is connected to the junction point A between resistors 16 and 17. As indicated by the schematic multipling connection, other repeaters, similar to the one shown, are connected at point A and points D, E. The point B, between resistors 17 and 18, is connected to the electrical mid-point of the secondary winding of input transformer 11, while the point C is connected to the electrical mid-point of the primary winding of the output transformer 14. The secondary winding of transformer 11 is connected at its opposite ends to the corresponding ends of the primary winding of transformer 14 through respective current limiting resistors 20, 21 and respective varistors 22, 23. These varistors are poled so that they only conduct in the "forward" direction indicated by the associated arrows when a suitable positive potential is applied to the respective electrodes 24, 25.

It will be observed that with the circuit of FIG. 1 the direct current potential of point B is higher than that of point C when the keying contacts 15 are open, with the result that both varistors 22, 23 become conductive in the forward direction and, since under this condition the varistor impedance is low, the alternating current from source 10 readily passes through the varistors and thence to the output terminals. On the other hand, when the keying contacts 15 are closed, it is clear that the point C becomes more positive than the point B since it is connected directly to the grounded positive terminal of battery 19. By suitable choice of the ratio of resistance of resistor 18 to resistor 17, the direct current potential of point B is thus held lower than that of point C when the keying contacts are closed. Thus a backward direct current bias is applied to the varistors 22, 23 and their impedance to the alternating current from source 10 is so high that the transmission of the alternating current to the output terminals 13 is effectively interrupted or effectively suppressed. In other words, an intermittent alternating signal current, which may be used for dialing purposes, is sent out from the output terminals 13 in response to the opening and closing of keying contacts 15. In such a system and in order that the signal current may be cut off with certainty while the contacts 15 are closed, it becomes necessary to insure that the potential of point B be maintained approximately at a constant value even if the current flowing in each keying circuit between the points B and F of each such circuit is changed by the simultaneous operation of one or more other keying circuits which are multipled to that shown in FIG. 1. Heretofore, in order to attain that result, it has been considered necessary to provide a sufficiently high current flow from the battery 19 through the resistors 17 and 18 to take care of all the multipled repeaters. Therefore, the power consumption per keying circuit amounts to several times the power that would normally be required for each keying operation alone.

FIG. 2 shows a repeater system according to the invention, and the parts of FIG. 2 which function the same as those of FIG. 1 bear the same designation numerals. According to the arrangement of FIG. 2, the above noted waste of power is completely eliminated, and furthermore it is not necessary to employ the separate input and output signal coupling transformers such as transformers 11 and 14. In the arrangement of FIG. 2, the necessary insertion loss control for the repeater transmission is effected without using a direct current connection between the keying direct current power supply and the repeater transmission line per se. By this arrangement the insertion loss control is independent of the alternating current transmission circuit, even when the same direct current keying source is used for a plurality of repeaters. The control device for the insertion loss, such for example as a varistor, is of such polarity that it is subjected to a "backward" direct current bias when the associated keying contacts are open, whereas in the arrangement of FIG. 1 the varistors are biased in the forward direct current direction when the keying contacts are open. Thus, the total power consumption of the system of FIG. 2 remains at a minimum.

In FIG. 2 the alternating current source is connected directly to the output terminals 13 and it may be multipled at points D, E to a plurality of similar repeaters, as indicated schematically by the multipling taps. As in FIG. 1, the direct current potential of point B is higher than that of point C when the keying contacts are open, but the varistors 22, 23 are connected in the opposite direction to that of FIG. 1, with the result that when the keying contacts 15 are open the varistors 22, 23 of FIG. 2 are subjected to a backward bias potential. The varistors 22, 23 are bridged across the secondary winding 26 of an insertion loss transformer 27 whose primary winding 28 is connected to source 10 through a suitable series resistor 29. Consequently when the keying contacts 15 are open the backward bias on varistors 22, 23 causes the impedance, as seen from the primary winding 28, to be high. Consequently the insertion loss under that condition is low or negligible and the signal current is easily transmitted from source 10 to the output terminals 13.

When the keying contacts 15 are closed, the potential of point C becomes higher than that of point B, it being understood that the direct current source 19 and the ratio of resistors 17 and 18 is chosen, as noted hereinabove, to maintain the rise in direct current potential of point C with respect to point B. Thus a forward bias current will flow through the varistors 22, 23 and their impedance likewise becomes low. As a result, the effective impedance of transformer 27, looked at from the primary

28, likewise becomes low and therefore the effective insertion loss between the source 10 and the output terminals 13 becomes very high. Therefore, as in the case of FIG. 1, the signal current will be sent out from the terminals 13 when the keying contacts 15 are open and it will be effectively stopped when those contacts are closed.

According to the system of FIG. 2, each direct current keying control circuit is independent from the associated signal current transmission circuit by being separated therefrom by the transformer 27 and therefore it is not affected by any other number of other keying circuits likewise connected in parallel to the source 10, with the result that there is no possibility that the make and break keying operations in the respective circuits mutually affect one another.

Therefore the resistances 17 and 18 need not be as low as in the case of FIG. 1, which latter requires a high current flowing through such resistors to give the necessary potential for the make and break operation at point B. In other words, a specially high direct current bleeder current for relieving the mutual interference encountered in the system of FIG. 1 is not required in FIG. 2, thus reducing the power dissipation. In addition, by selecting the control polarity of the varistors 22 and 23 oppositely with respect to those of FIG. 1, power consumption in the direct current circuit is further minimized when the keying contacts 15 are open. In FIG. 2 when the contacts 15 are open and therefore the backward bias voltage is applied to the varistors, little current can flow through the direct current keying control circuit and resistances 16 and 18 can be made very high, which permits the resistance 17 to be comparatively low. Upon the closure of the keying contacts 15 in FIG. 2, a forward bias current flows through the varistors, this forward current mainly flowing through the resistor 17 and through the insertion loss circuit to ground through the keying contacts 15. The net result is a reduction in the wasteful consumption of power in the direct current circuit. It should be observed that in the system of FIG. 2, if the varistors 22, 23 were polarized in the opposite direction, as they are in FIG. 1, the forward bias current will be received when the keying contacts 15 are open and the direct current power consumption would be immediately increased to several times its value. Furthermore, the arrangement of FIG. 2 permits the deletion of the output transformer and furthermore the signal current transmission circuit between the source 10 and the output terminals can be either balanced or unbalanced independently of the direct current keying circuit which is not possible with the arrangement of FIG. 1.

While in the foregoing the direct current resistance of the line L between the point C and the keying contacts has been ignored, the resistance of this line does not modify the operation of the system as described.

Figure 3:
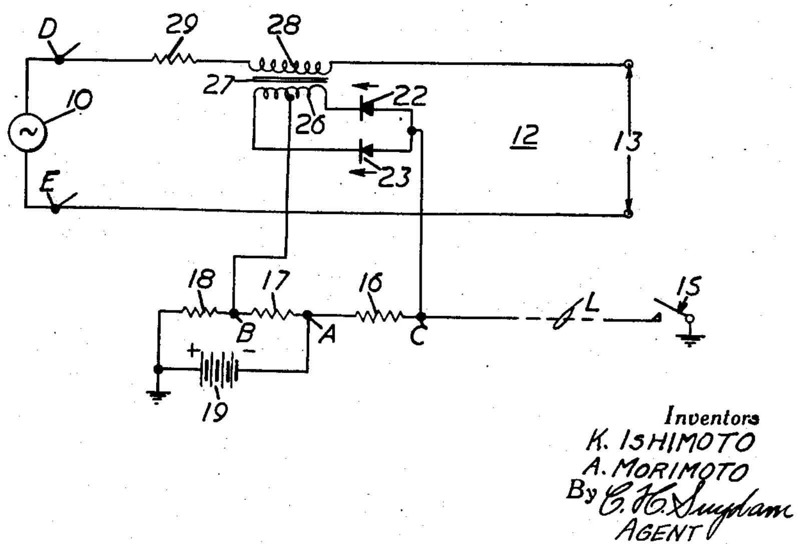
FIG. 3 is a modification of the arrangement of FIG. 2.

FIG. 3 shows a modification of the system of FIG. 2, wherein the primary winding 28 of the insertion loss transformer 27, instead of being connected in shunt to the line conductors, is connected in series therewith. In this arrangement the insertion loss being in series with the line, the relation between the operation of the keying contacts 15 and the transmission from the output terminals 13 is opposite to that of FIG. 2. In other words, when the keying contacts 15 are open, the insertion loss by means of transformer 27 and the varistors 22 and 23 is high, and the signal currents from source 10 are effectively suppressed or interrupted before reaching the terminals 13. On the other hand, closure of the keying contacts 15 in FIG. 3 reduces the effective series impedance or insertion loss and effectively permits the alternating current signals from source 10 to be transmitted from terminals 13.

While certain specific embodiments have been disclosed herein, it will be understood that various changes and modifications may be made therein without departing from the spirit and scope of the invention.

What is claimed is:

1. A keying arrangement for a transmission circuit comprising in combination a pair of keying points one of which is grounded, a chain of at least three resistors connected in series between the other of said keying points and ground, a direct current source connected between ground and an intermediate point in said chain whereby said chain of resistors has a pair of potential points whose relative polarity is reversed upon a low resistance path being established between said keying points; and an alternating current source, a pair of output terminals galvanically connected to said alternating current source, a transformer primary winding connected between said alternating current source and said output terminals, a secondary winding inductively coupled to said primary winding, two asymmetric conductive devices connected across said secondary winding in series opposition, said pair of potential points being respectively connected to a center tap on said secondary winding and the junction of said asymmetric devices whereby said polarity reversal effects an extreme change in insertion loss between said alternating current source and said output terminals.

2. A keying arrangement as claimed in claim 1 wherein the transformer primary winding is in series between the input and output of said four terminal network.

3. A keying arrangement as claimed in claim 1 wherein the transformer primary winding is in shunt between the input and output of said four terminal network.

References Cited in the file of this patent

UNITED STATES PATENTS

| | | |
|---|---|---|
| 1,652,923 | Alexanderson | Dec. 13, 1927 |
| 2,688,699 | Hiehle | Sept. 7, 1954 |
| 2,817,057 | Hollmann | Dec. 17, 1957 |